(12) United States Patent
Bly et al.

(10) Patent No.: US 7,272,150 B2
(45) Date of Patent: Sep. 18, 2007

(54) SYSTEM AND METHOD FOR SHAPING TRAFFIC FROM A PLURALITY OF DATA STREAMS USING HIERARCHICAL QUEUING

(75) Inventors: Keith Michael Bly, Newman Lake, WA (US); C Stuart Johnson, Liberty Lake, WA (US)

(73) Assignee: World Wide Packets, Inc., Spokane Valley, WA (US)

( * ) Notice: Subject to any disclaimer, the term of this patent is extended or adjusted under 35 U.S.C. 154(b) by 1087 days.

(21) Appl. No.: 10/224,508

(22) Filed: Aug. 19, 2002

(65) Prior Publication Data

US 2004/0032830 A1 Feb. 19, 2004

(51) Int. Cl.
*H04L 12/28* (2006.01)
*H04L 12/56* (2006.01)

(52) U.S. Cl. .................... 370/414; 370/416; 370/418

(58) Field of Classification Search .......... None
See application file for complete search history.

(56) References Cited

U.S. PATENT DOCUMENTS

| | | | |
|---|---|---|---|
| 5,164,938 A | 11/1992 | Jurkevich et al. | 370/231 |
| 5,748,629 A | 5/1998 | Caldara et al. | 370/389 |
| 5,758,137 A * | 5/1998 | Armstrong et al. | 713/502 |
| 5,872,769 A | 2/1999 | Caldara et al. | 370/230 |
| 5,926,459 A | 7/1999 | Lyles et al. | 370/230 |
| 5,953,318 A | 9/1999 | Nattkemper et al. | 370/236 |
| 5,999,518 A | 12/1999 | Nattkemper et al. | 370/258 |
| 6,052,375 A | 4/2000 | Bass et al. | 370/412 |
| 6,064,650 A | 5/2000 | Kappler et al. | 370/232 |
| 6,064,651 A | 5/2000 | Rogers et al. | 370/233 |
| 6,064,677 A | 5/2000 | Kappler et al. | 370/414 |
| 6,067,298 A * | 5/2000 | Shinohara | 370/395.71 |
| 6,084,856 A | 7/2000 | Simmons et al. | 370/235 |
| 6,167,054 A | 12/2000 | Simmons et al. | 370/422 |
| 6,167,445 A | 12/2000 | Gai et al. | 709/223 |
| 6,195,355 B1 | 2/2001 | Demizu | 370/397 |
| 6,205,118 B1 * | 3/2001 | Rathnavelu | 370/229 |
| 6,259,699 B1 | 7/2001 | Opalka et al. | 370/398 |
| 6,343,081 B1 | 1/2002 | Blanc et al. | 370/411 |
| 6,438,134 B1 | 8/2002 | Chow et al. | 370/412 |
| 6,445,707 B1 * | 9/2002 | Iuoras et al. | 370/395.43 |
| 6,477,144 B1 | 11/2002 | Morris et al. | 370/230.1 |
| 6,487,212 B1 | 11/2002 | Erimli et al. | 370/413 |
| 6,628,652 B1 | 9/2003 | Chrin et al. | 370/386 |
| 6,714,553 B1 | 3/2004 | Poole et al. | 370/412 |
| 6,754,206 B1 | 6/2004 | Nattkemper et al. | 370/369 |
| 6,950,400 B1 | 9/2005 | Tran et al. | 370/236 |
| 6,980,552 B1 | 12/2005 | Belz et al. | 370/392 |
| 7,042,841 B2 | 5/2006 | Abdelilah et al. | 370/229 |
| 7,058,789 B2 | 6/2006 | Henderson et al. | 711/220 |
| 7,072,295 B1 | 7/2006 | Benson et al. | 370/230 |
| 2001/0001608 A1 | 5/2001 | Parruck et al. | 370/232 |
| 2001/0055303 A1 | 12/2001 | Horton et al. | 370/389 |

(Continued)

*Primary Examiner*—Chi Pham
*Assistant Examiner*—Ronald Abelson
(74) *Attorney, Agent, or Firm*—Wells St. John P.S.

(57) ABSTRACT

A system for shaping traffic from a plurality of data streams comprised of a first queuing stage configured to shape traffic from the data streams and having a plurality of shaping queues; and a second queuing stage coupled to the first queuing stage and configured to manage congestion from the first queuing stage that occurs when multiple of the shaping queues become eligible to send traffic at substantially the same time.

18 Claims, 7 Drawing Sheets

U.S. PATENT DOCUMENTS

| | | |
|---|---|---|
| 2002/0071387 A1 | 6/2002 | Horiguchi et al. .......... 370/229 |
| 2002/0172273 A1* | 11/2002 | Baker et al. ................ 375/222 |
| 2002/0191622 A1 | 12/2002 | Zdan .......................... 370/401 |
| 2003/0076848 A1 | 4/2003 | Bremler-Barr et al. ..... 370/412 |
| 2006/0233156 A1 | 10/2006 | Sugai et al. ................ 370/351 |

\* cited by examiner

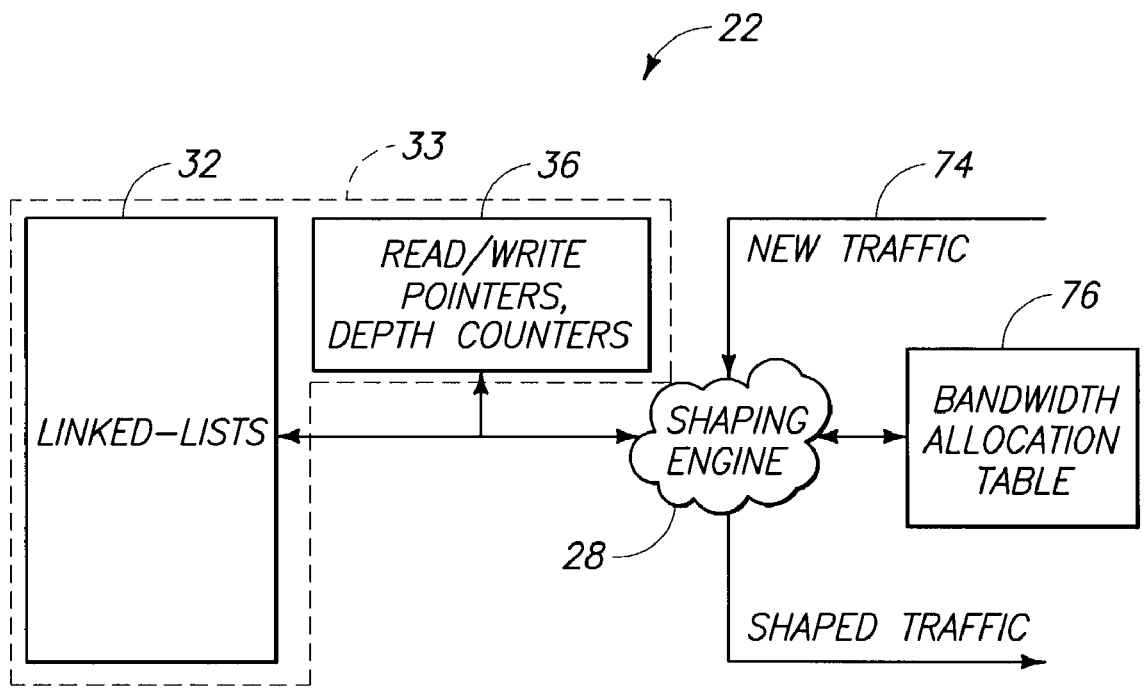
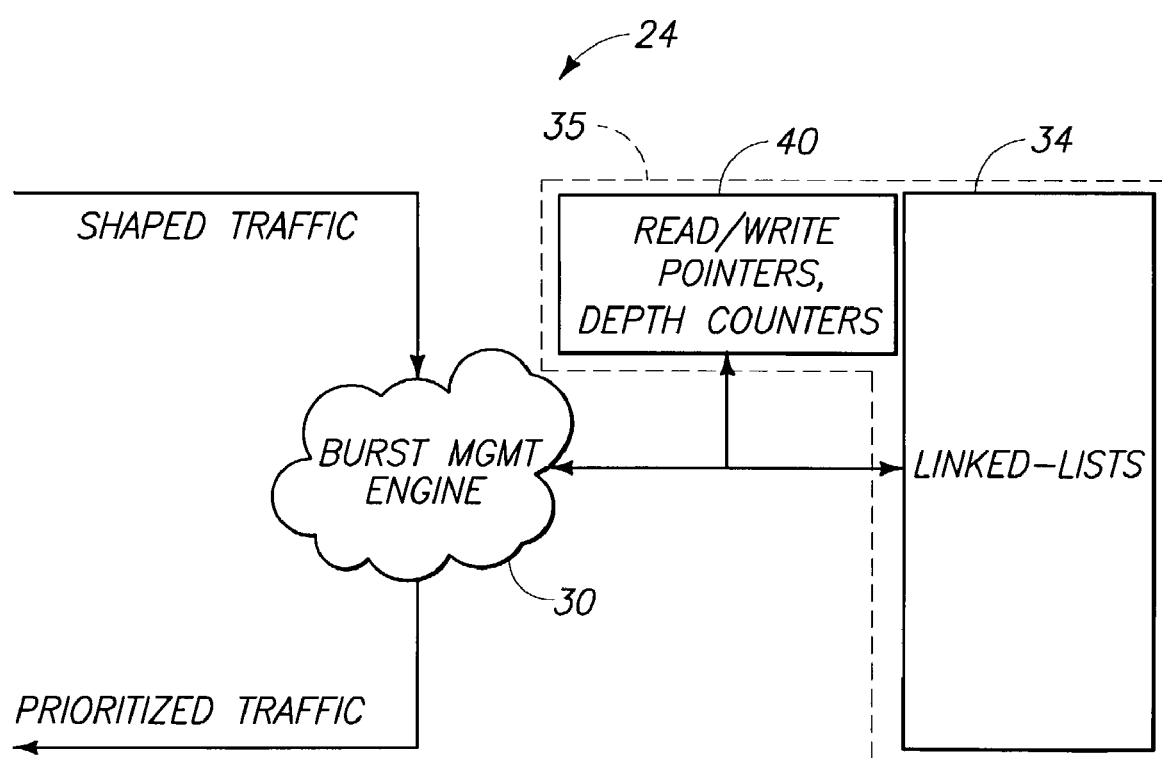

|  |  |
|---|---|
| QUEUE 0 | 10 CREDITS | ← 78
| QUEUE 1 | 5 CREDITS | ← 79
| QUEUE 2 | 2 CREDITS | ← 80
| QUEUE 3 | 1 CREDITS | ← 81
| QUEUE 0 | 10 CREDITS | ← 82
| QUEUE 1 | 5 CREDITS | ← 83
| QUEUE 2 | 2 CREDITS | ← 84
| QUEUE 3 | 1 CREDITS | ← 85

FIG. 8

| QUEUE | CREDITS |
|---|---|
| QUEUE 0 | 20 |
| QUEUE 1 | 10 |
| QUEUE 2 | 4 |
| QUEUE 3 | 2 |

FIG. 9 understand # SYSTEM AND METHOD FOR SHAPING TRAFFIC FROM A PLURALITY OF DATA STREAMS USING HIERARCHICAL QUEUING

TECHNICAL FIELD

The invention relates to methods and apparatus for improving communications in digital networks. The invention also relates to bandwidth control in digital networks and traffic shaping in digital networks.

BACKGROUND OF THE INVENTION

Traffic shaping is important in digital networks. Traffic shaping involves buffering traffic and sending traffic based upon a desired profile. A traffic profile can include, but is not limited to the following properties: a level of priority relative to other traffic, buffer depth, latency through the buffer, jitter in sending the traffic contained in the buffer, and a rate at which the traffic should be sent. A common approach to traffic shaping involves the use of a queuing system to manage the profile. As traffic arrives, it is placed on the queue. The traffic is de-queued based upon its assigned drain rate. This is illustrated in FIG. 1. A single stream of traffic arrives at the input of a queue at a rate depicted by solid line 10. The desired output rate is depicted by the dotted line 12. It is highly desirable to smooth the input such that the output approaches the desired output rate 12.

To perform cost effective shaping of traffic, a traffic shaping device should be able to shape a large number of traffic profiles, as shown in FIG. 2. More particularly, FIG. 2 shows several input streams 10, 14, and 16 and desired outputs 12, 18, and 20 for those input streams. Supporting (and uniquely shaping) large numbers of traffic streams means supporting a large number of queues. However, traditional queuing structures do not scale well due to the exponential growth of instancing each queuing engine, and arbitration mechanisms that are needed to aggregate the resulting dequeued traffic to be sent. This implies that supporting a large number of queues using traditional queuing structures is inherently not cost effective.

Disadvantages of the prior methods include: 1) lack of scalability; 2) sheer size, and gate-count cost per queue for de-centralized shaping engines; 3) expensive caching/arbitration mechanisms; and 4) inability to shape traffic with a desirable line of granularity across a broad spectrum of desired rates. Therefore, a new type of queuing structure is needed.

BRIEF DESCRIPTION OF THE DRAWINGS

Preferred embodiments of the invention are described below with reference to the following accompanying drawings.

FIG. 4 is a block diagram illustrating construction details of the traffic shaping queuing stage of FIG. 3.

FIG. 5 is a block diagram illustrating construction details of the congestion handling queuing stage of FIG. 3.

FIG. 8 illustrates a table based credit allocation scheme used in the traffic shaping queuing stage of FIG. 3.

FIG. 9 illustrates credits earned after traversing the table of FIG. 8 one time.

DETAILED DESCRIPTION OF THE PREFERRED EMBODIMENTS

Figure 1:
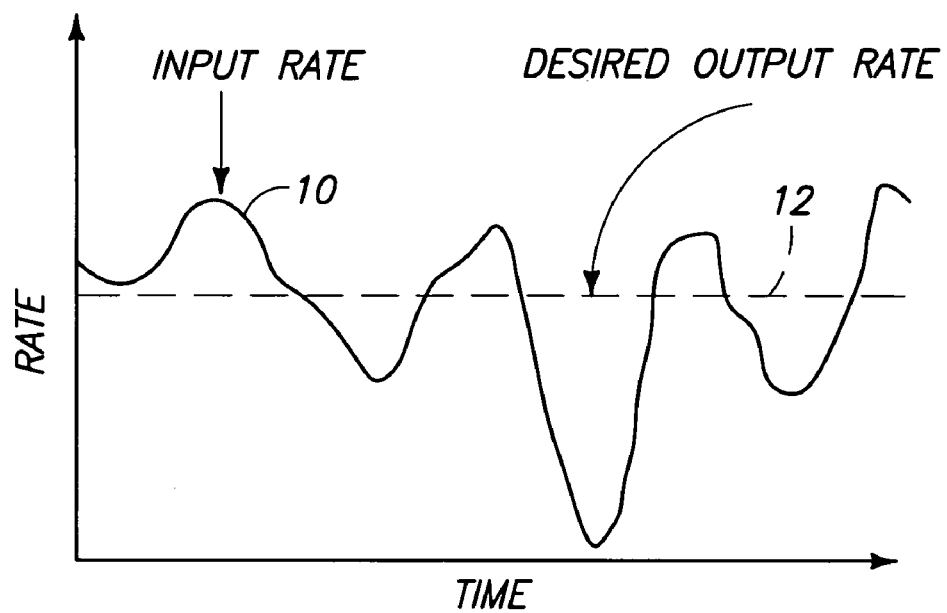
FIG. 1 is a plot of rate versus time illustrating the difference between data traffic input rate and desired output rate.
Figure 2:
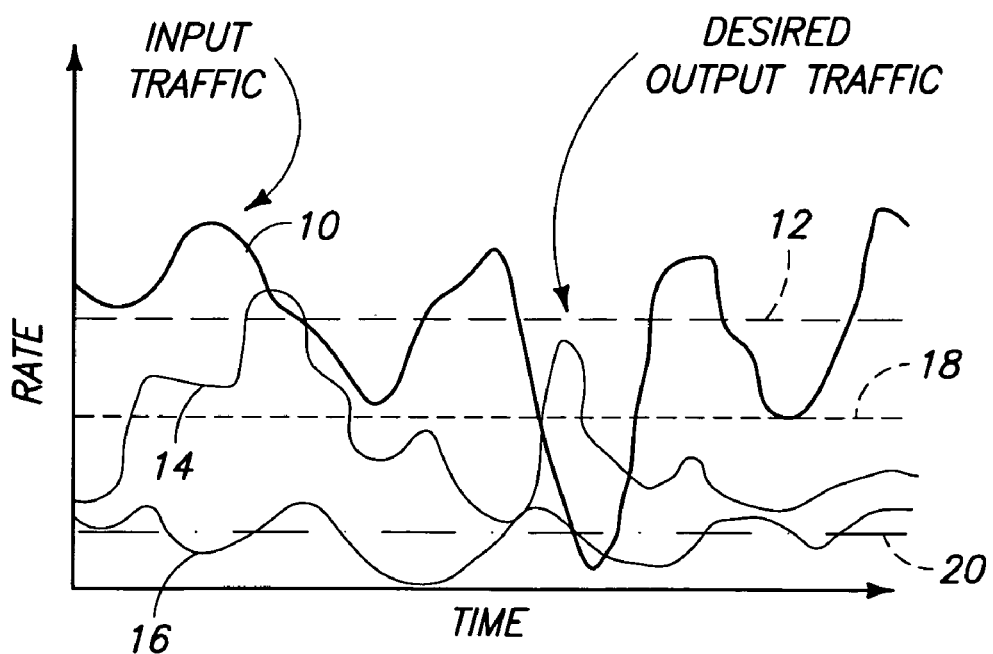
FIG. 2 is a plot of rate versus time illustrating several input streams and respective desired outputs.

This disclosure of the invention is submitted in furtherance of the constitutional purposes of the U.S. Patent Laws "to promote the progress of science and useful arts" (Article 1, Section 8).

The invention provides a system for shaping traffic from a plurality of data streams, the system comprising a first queuing stage configured to shape traffic from the data streams and having a plurality of shaping queues; and a second queuing stage coupled to the first queuing stage and configured to manage congestion from the first queuing stage that occurs when multiple of the shaping queues become eligible to send traffic at substantially the same time.

In one embodiment, each queue in the first queuing stage is configured to represent the desired profile of a given type of traffic. One of the fields that is configurable is the priority of the queue. Each time an entry is sent to the second queuing stage from a given queue, the queue's priority value is sent with it.

In one embodiment, the queues in the first queuing stage are serviced by a shaping engine, sending entries to the second queuing stage from any of the queues that are found to be eligible, without regard to any notion of precedence. The shaping engine determines a queue's eligibility, by updating a queues credit and then evaluating whether the queue has enough credit to send the next pending entry in it.

In one embodiment, the order of credit updating for the shaping queues is determined by the sequential accessing of a credit (or bandwidth) table. This table is called the bandwidth allocation table, and a depiction of it is shown in FIG. 8. The shaping engine steps through the table updating each queue listed, by adding the credit listed to the queue's credit accumulation bucket. Once the amount of credit in the credit accumulation bucket meets or exceeds the amount needed to send the next pending entry in the queue, that entry is sent to the second queuing stage.

In one embodiment, the second queuing stage is comprised of a set of queues, each one serving a single, specific priority of traffic. Each time an entry is sent from the first stage, the first stage presents the configured priority of the first stage queue from which the entry came with the entry. The second stage uses this priority value to know on which of its queues to place the entry.

In one embodiment, the queues in the second queuing stage are serviced in a traditional queue servicing style known as starve mode. However, in other embodiments, other queue servicing models can be used, such as weight round robin, or pure round robin. For starve mode, this means the highest priority queue that is not empty is always serviced first, e.g. given first chance at consideration for sending an entry.

Additionally, in one embodiment, each queue in the first queuing stage can only have one entry outstanding in the second queuing stage. In order to track this, when a queue in the first queuing stage sends an entry to the second queuing stage, a "pending" flag is set for the first stage queue. This pending flag overrides any subsequent evaluations of this first stage queue for credit-based eligibility to send another entry. When the second queuing stage finally sends this entry, it reports back to the first queuing stage that the outstanding entry for the specific first stage queue was sent. The first stage queue removes its pending flag when this notice is received, and then evaluates whether it is again eligible to send the next entry it has. This assumes the queue is not empty. If the queue is empty, no further action is taken beyond removing the pending flag.

This simple pending flag handshake protocol combined with the simple servicing scheme of the second stage queues is advantageous. No longer is there a need for a massive arbitration mechanism to determine which entry to send from which queue in the first stage queuing structure. The engine no longer has to track which queue went last, in order to provide fairness, as the inherent ordering that comes with the second stage queuing structure enforces this fairness automatically. And, the engine no longer needs to determine who wins in a tie, due the natural ordering of the starve mode servicing algorithm.

Figure 3:
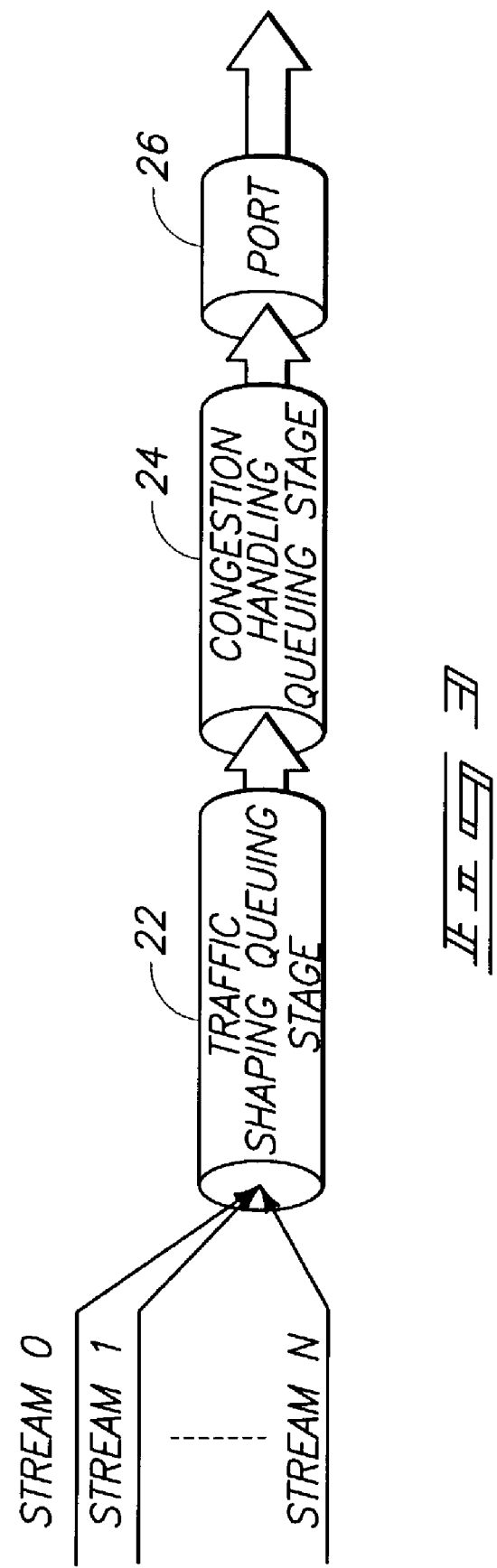
FIG. 3 is a diagrammatic illustration of a hierarchical queuing system embodying the invention, and including a traffic shaping queuing stage and a congestion handling queuing stage.

FIG. 3 shows a centralized two-level queuing structure, with a first stage (a traffic shaping queuing stage) 22 responsible for shaping of traffic, and the second stage (a congestion handling queuing stage) 24 responsible for handling instantaneous congestion from the first stage 22. Traffic that is released from the congestion handling queuing stage 24 is transferred to a port, or ports 26. Each stage 22 and 24 has its own central engine, which runs generally independently of the other. More particularly, the first stage 22 has a shaping engine 28 (see FIG. 4) and the second stage 24 has a burst management engine 30 (see FIG. 5). The engines can be defined, for example by a microprocessor, or other digital circuitry. More particularly, in one embodiment, the engines are defined by software that can be executed by a common processor or digital circuit, or by separate processors or digital circuits, though the software for the shaping engine 28 and the software for the burst management engine 30 run independently of each other.

Both stages 22 and 24 are linked-list based. The stage 22 includes linked lists 32 (see FIG. 4), and the stage 24 includes linked lists 34 (see FIG. 5).

FIG. 4 is a block diagram of the traffic shaping queuing stage 22, which includes "shaping" queues 33. Each of the shaping queues of the stage 22 maintains its own set of read/write pointers and a depth counter to manage a unique linked-list within the same physical space as the other queues of the first stage 22. Two tables are used to house the shaping queues 33: one table 32 for the linked-lists, and the other table 36 to hold read/write and head/tail pointers, depth counters, etc., for the linked-lists. Other configurations are possible. The stage 22 also includes a bandwidth allocation table 76 which will be described in greater detail in connection with FIG. 8.

FIG. 5 is a block diagram of the second stage 24, which includes "congestion" queues 35 to handle the instantaneous bursts from the shaping queues 33 of the first stage 22. Each congestion queue of the congestion handling queuing stage 24 maintains its own set of read/write pointers and a depth counter to manage a unique linked-list within the same physical space as the other queues of the second stage 24. Two tables are used to house the profile queues 35: one table 34 for the linked-lists, and the other table 40 to hold read/write and head/tail pointers, depth counters, etc., for the linked-lists. Other configurations are possible.

The second stage 24 absorbs the potential bursts from the shaping queuing stage 22, which occur when multiple shaping queues 33 become eligible to send traffic within the same relatively small interval. This shaped traffic is then placed on the queue of the appropriate priority in stage 24.

The engine 30 drains traffic from the priority queues 35 in a starve-mode fashion, always servicing the highest priority queue that has traffic to send. The queues 35 of the second stage 24 are relatively small, as the maximum depth allowed equals the number of shaping queues 33 present in the first stage 22. This allows the first stage 22 to be an efficient buffer, in that if there is traffic on other shaping queues 33 of higher priority, it blocks the lower priority traffic, and therefore no large overhead from a traditional arbitration mechanism such as a content addressable memory (In a connectionist system, data is stored in the activation pattern of the units—if a processing unit receives excitatory input from one of its connections, each of its other connections will either be excited or inhibited. If these connections represent the attributes of the data then the data may be recalled by any one of its attributes, not just those that are part of an indexing system. Because these connections represent the content of the data, this type of memory is called content addressable memory).

No longer must a costly engine be implemented which looks at all of the entries ready to send to pick the best one. The very nature of hierarchical queuing 33 and 35 is the self-ordering/arbitration of traffic when instantaneous congestion occurs.

Pointers and linked lists are known in the computer arts. A pointer is a variable that points to another variable by holding a memory address. A pointer does not hold a value but instead holds the address of another variable. A pointer points to the other variable by holding a copy of the other variable's address. A read/write pointer keeps track of a position within a file from which data can be read or written to. A linked list is a chain of records called nodes. Each node has at least two members, one of which points to the next item or node in the list. The first node is the head, and the last node is the tail. Pointers are used to arrange items in a linked list, as illustrated in FIG. 6.

Figure 6:
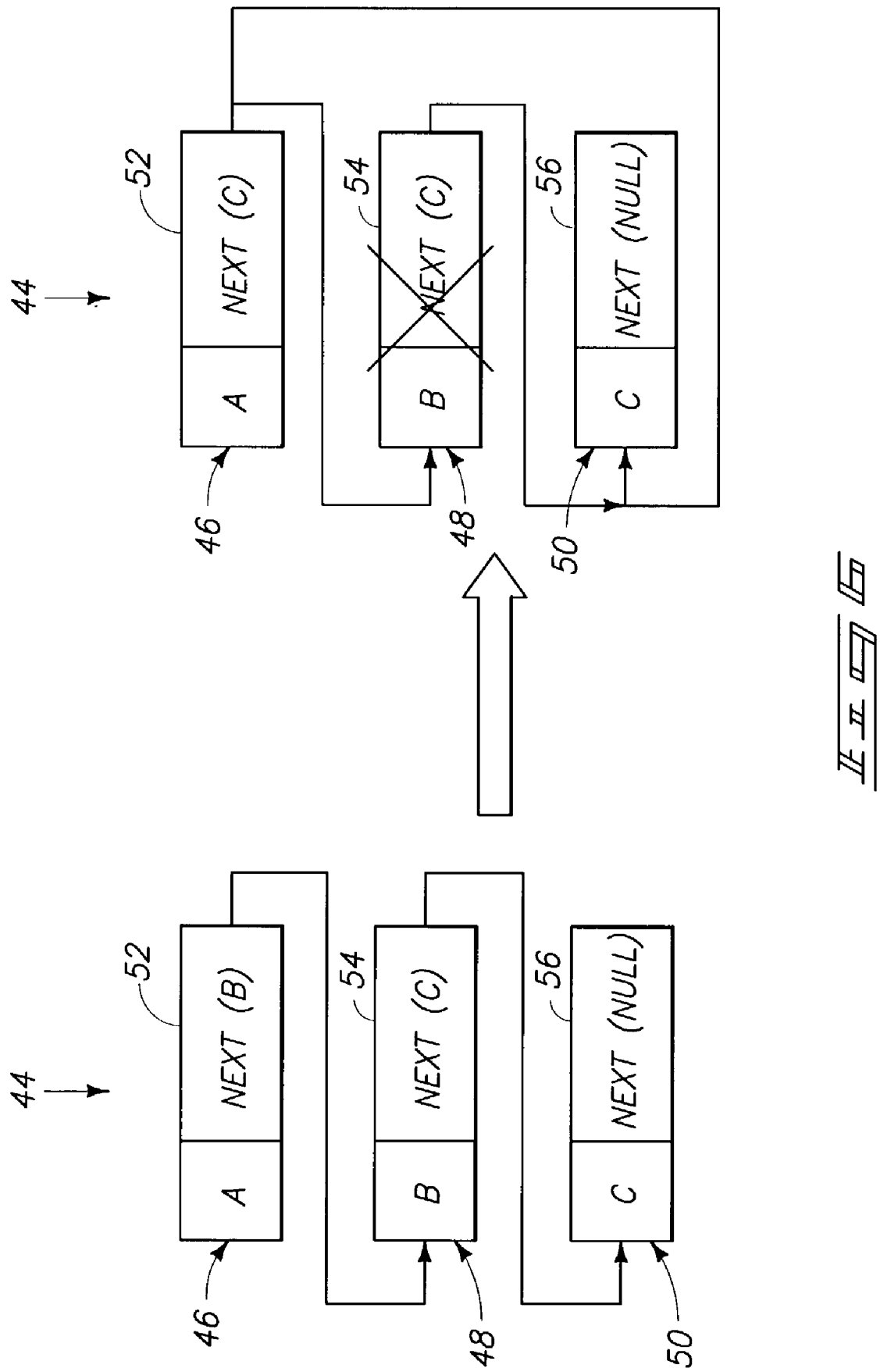
FIG. 6 is a simplified illustration of a linked list included in the traffic shaping queuing stage of FIG. 3 or the congestion handling queuing stage of FIG. 3.
Figure 7:
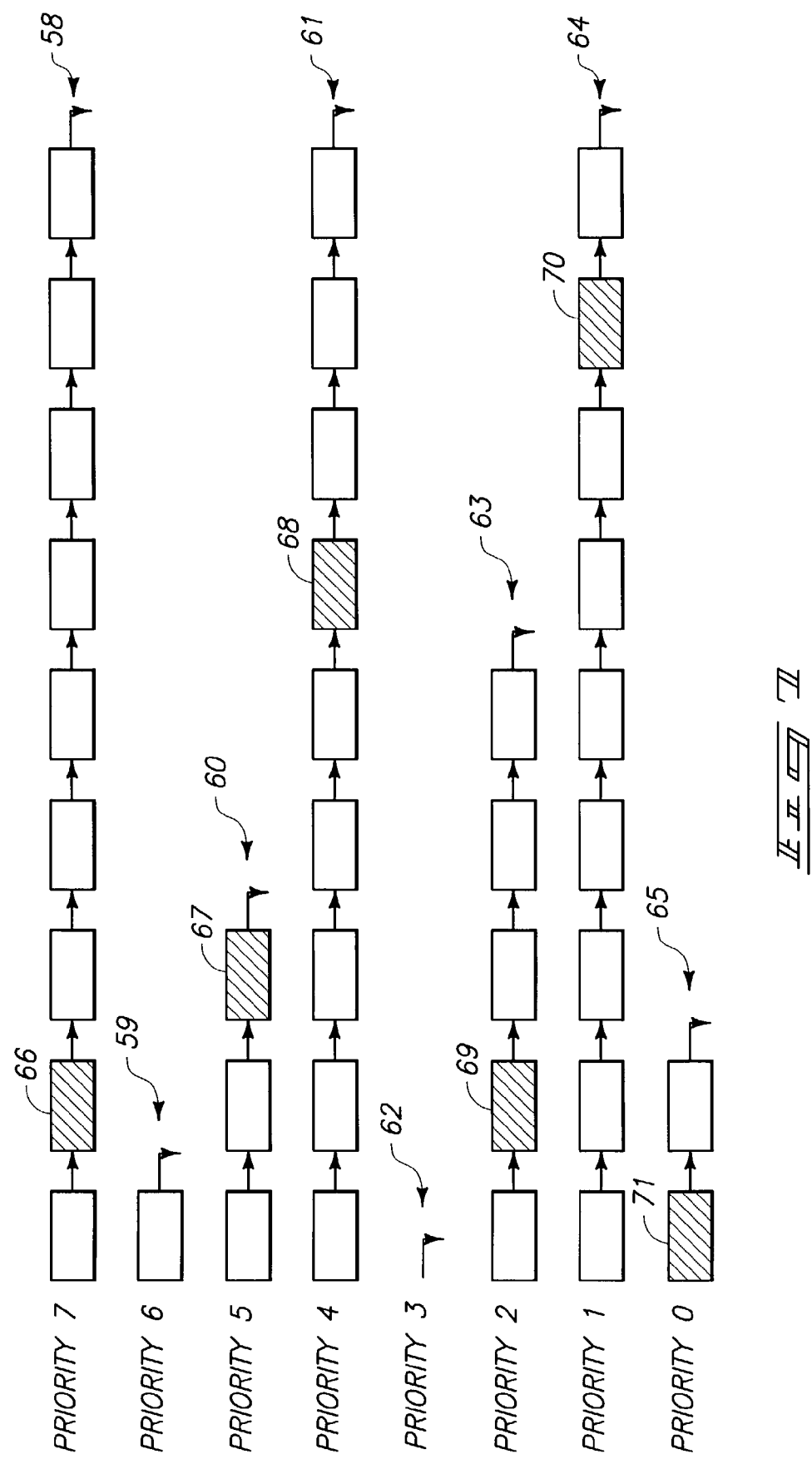
FIG. 7 illustrates a set of priority-based queues included in the congestion handling queuing stage of FIG. 3.

FIG. 6 shows a simplified example 44 of a linked list that could be included in the linked lists 34 and illustrates linked list editing. Each entry or node 46, 48, and 50 (A, B, and C) includes a pointer 52, 54, and 56. If entry B is found to be eligible to be sent (removed from the list), where entry A was not, entry B is removed and sent (transmitted), and the link from A is repaired or edited to now point to C. FIG. 7 illustrates multiple queues 58–65 defined by linked lists, and that could define, for example, the priority queues 35. FIG. 7 shows eight linked lists representing eight levels of traffic priority; other numbers of lists could be employed. The shaded entries 66–71 illustrate eligible entries that need to be sent, with the remaining entries being blocked for any of a variety of reasons. The blocked entries can be edited in a manner such as is shown in FIG. 6. The linked lists 32 are similar to those shown in FIG. 7 but are all first-in, first out (FIFO); and intermediate entries cannot be sent.

The number of queues 33 and 35 in this architecture (FIGS. 3–5) is such that an infinite number of queues could be supported for either the traffic shaping queuing stage 22 or the congestion handling queuing stage 24. The number of queues 33 and 35 is only bound by size constraints of the silicon technology currently available, and the specific needs of the implementation in question.

The shaping engine 28 en-queues incoming traffic 74 (see FIG. 4) onto a selected one of the shaping queues 33 based upon look-up information, which classifies the traffic. Streaming audio or video would be classified differently than e-mail, because streaming audio or video requires sufficient bandwidth to play without interruption. Therefore like-traffic, such as a stream or set of streams is placed on the same one of the shaping queues 33. "Like traffic" can be defined as desired for a particular application. It could be, for example, "all video traffic", or it could be "all pay-per-view" video traffic, or it could be "all traffic for customer X", or it could be all email traffic. It is a grouping of traffic with similar needs. Video, for example requires a fast rate, with low latency and jitter influences. Email on the other hand, can be handled on a "best efforts" basis; i.e. low-priority, without regard to latency and jitter.

This shaping queue can have a shaping profile, which includes properties such as: priority, depth, latency, jitter, and rate. For example, video needs to always gets through. A large amount of latency is not desirable for video, as any latency will cause the resulting picture to become jerky, and fall behind. The same is true of the rate at which video is sent. A constant, consistent stream should be used to supply the video information "just in time" for the next entry (e.g. frame) of the picture on a TV or computer. Therefore, "video" traffic is properly classified so that it is managed appropriately. Because the video must always get through, it is given a "high" priority. Because video cannot be influenced/slowed-down with a large amount of latency, the depth of the queue is selected to be shallow. Therefore, little data can build up, waiting in the queue. With regard to rate, the video queue gets its own bandwidth end-to-end on a switch, and doesn't have to compete with any other queue for bandwidth. Queues for other classifications of traffic would similarly have appropriately chosen priorities, depths, latencies, jitter, and rates.

The rate-algorithm for the shaping queues 33 is a table based credit allocation scheme. A fixed size bandwidth allocation table 76 is traversed at a constant rate, with each location (e.g. row) 78–85 (FIG. 8) in the table identifying a shaping queue and the amount of credit to allocate to that shaping queue. Because the table is traversed at a known rate, the desired rate for one of the shaping queues 33 can be achieved by loading a specific number of entries in the table with a specific amount of credit for that shaping queue. This defines the rate at which entries can be de-queued. As long as there is enough traffic to keep the queue from being empty, this drain rate can be maintained indefinitely. The rate itself is calculated by dividing the amount of credit listed in the table 76 by the time it takes to traverse the table 76 one time. A shaping queue is considered eligible to send an entry (e.g., a packet or, more particularly, a frame) when the queue has acquired enough credit to send the entry in question.

Based upon the needs of the design in which this queuing structure is implemented, the size of the table 76 can be adjusted to provide the desired minimum and maximum achievable rates. The minimum rate is defined by one credit divided by the table traversal time, and the maximum rate is defined by the maximum number of entries allowed in the table, each containing the maximum number of credits, divided by the table traversal time. The maximum number of entries allowed in the table is dictated by the implementation. For example, the maximum number of entries allowed in the table is determined by the overall "profile" of the port(s) supported by this queuing structure, etc. More particularly, the maximum number of entries allowed in the table is determined by the circuitry or software (e.g. a state-machine) that manages traversing the table relative to the number of queues in the implementation, and how it manages updating the credit for each queue.

When the traffic shaping queuing stage 22 is eligible to send traffic based upon its rate-algorithm, the first entry in the appropriate one of the queues 33 of the traffic shaping queuing stage 22 is sent to the second stage 24. This, however, happens only if the shaping queue in question does not already have an entry pending in the second stage 24. Whenever an entry is sent to the second stage 24, the first stage keeps track of this by, for example, setting a "pending" flag for that specific shaping queue. The pending flag is only lowered when the second stage 24 de-queues that specific entry. At that time, the shaping queue can reevaluate its shaping status, to see if it is again eligible to send the next entry (assuming the shaping queue is not empty).

The second stage 24 is a set of priority-based queues 35. Each time an entry is sent to the second stage 24 from the first stage 22, it is accompanied by information indicating the priority of the shaping queue from which it came. This priority is used to determine on which of the priority queues 35 to place the entry. Because a queue from the traffic shaping queuing stage 22 can have only one entry at a time in the priority queues 35, the total space required for this set of priority queuing linked-lists 34 is based on the number of shaping queues in existence.

The second stage 24 uses a burst management engine 30 to traverse the priority queues 35 in a starve-mode, such that the one with the highest priority will be serviced first, sending any entries it may have prior to doing the same for lesser priority queues. This second stage 24 is advantageous because the first stage 22 may have more than one queue become eligible to send an entry at relatively the same time. In fact, all shaping queues 33 could potentially become eligible at relatively the same time. It is when this occurs that the value of the second stage 24 becomes apparent, as it buffers up all of these eligible entries, and then doles them out over time (highest priority first) based upon the through-put available for the port or ports 26 supported by the queues 35. This simplifies the searching needed, and allows for an infinite number of queues 33 and 35 to be managed, by dividing the problem into two simpler steps: earning bandwidth, followed by transmission arbitration. This eliminates the need for expensive caching and/or fairness algorithms.

The preferred embodiment of the invention uses a starve mode servicing algorithm to manage the second queuing stage. However, other traditional servicing algorithms can be used as well, such as weighted round robin, and pure round robin. The choice of algorithm is dependant upon the implementation needs of the design at hand. The preferred embodiment uses starve mode, because it provides the most useful form of priority-based precedence-ordering of traffic in a congested situation, which this invention is meant to best solve for.

Figure 10:
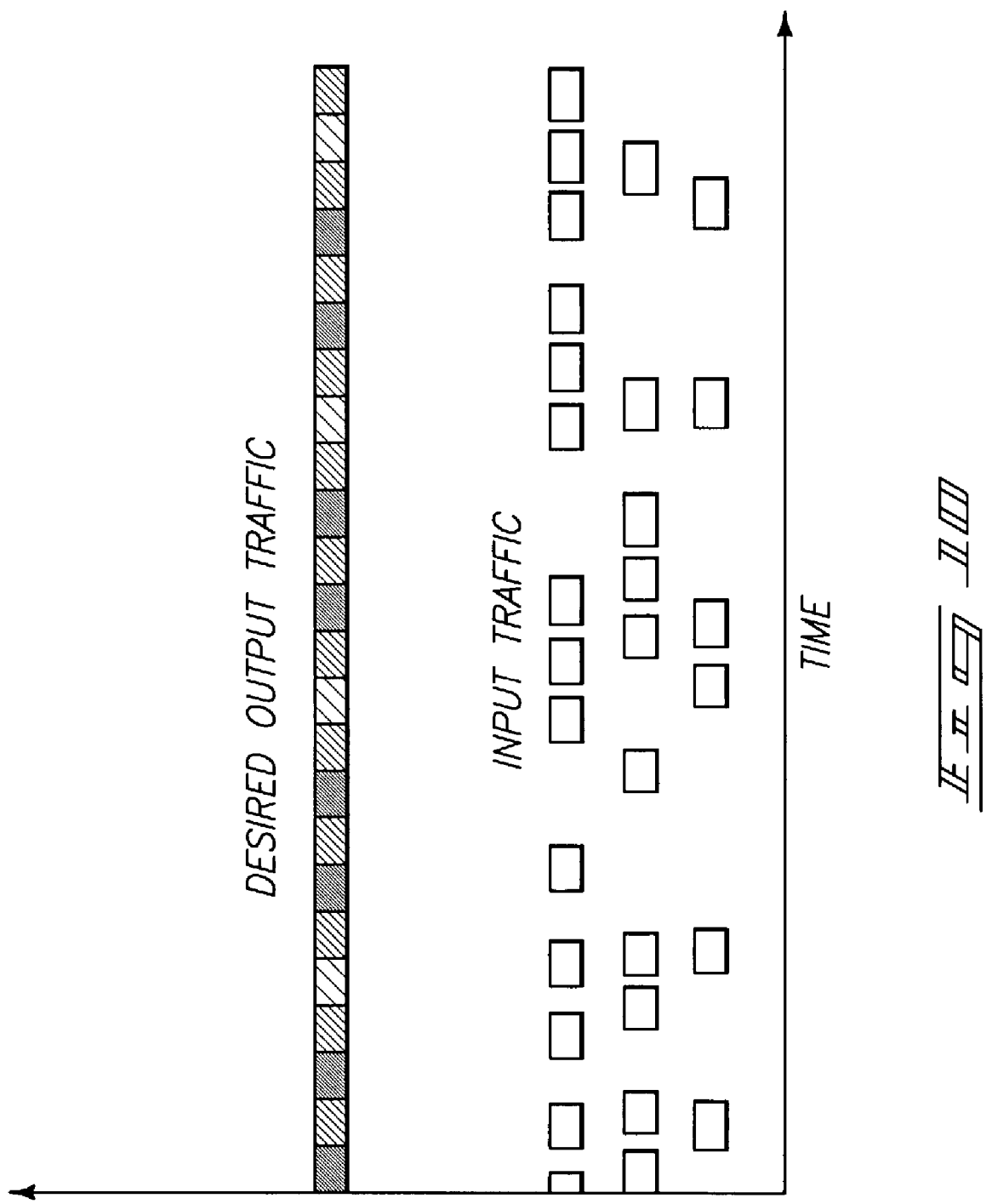
FIG. 10 illustrates how utilization of a port or pipe by multiple streams of traffic is maximized by the system of FIG. 3.

The resulting desired shaping behavior is depicted in FIG. 10, this time using packets rather than rate measurements. As shown, the utilization of the port or pipe is maximized, and the traffic smoothed to help ease congestion further on in the network.

Problems solved by the preferred embodiment of the invention include management of the shaping and crediting of a large number of queues by a central "shaping" engine.

Another problem solved by the preferred embodiment is management in the form of arbitration between a large number of queues all vying to send traffic at the same instant in time, using a central "arbitration" mechanism. The preferred embodiment provides a solution that is scalable, providing the ability to shape traffic for a variety of implementations in a cost effective manner; i.e., in a smaller feasible design.

The preferred embodiment of the invention provides a centralized queuing structure, capable of supporting one or more ports, with a high queue density count. This centralized queuing structure is capable of dynamically supporting different ports over time, rather than a fixed set of queues only able to support a single port or ports. The design of the preferred embodiment is also scalable. The design of the preferred embodiment, by its very nature, can be implemented for one queue up to the feasible limits of today's technology, without significantly increasing the size of the central engine. The only increase to cost of increasing size is the space needed for the linked-list management. Further, the design of the preferred embodiment by its very nature can be implemented to support an infinite variety of min/max rate relationships. Previous implementations could only perform gross granularity transitions for various desired rates.

The preferred environment is all of Ethernet. Slight modification to "shaping" profiles would allow for use in any communication technology including, for example, ATM and SONET.

In one embodiment, the first and second queuing stages are defined together on a single ASIC, which provides for sufficient clock-speed to support Gigabit Ethernet rates.

Having a two-stage structure provides efficiency and performance advantages over a traditional queue-arbitration mechanism. No longer is a massive arbiter or caching engine needed to manage choosing which traffic to send from a plurality of queues when instantaneous congestion occurs across those queues.

Various alternative embodiments are possible. For example, one alternative embodiment has a reduced or increased number of shaping queues. Another alternative embodiment has a reduced or increased number of priorities. The two stage design can be implemented in a per port fashion instead of in a central queuing system.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A system for shaping traffic from a plurality of data streams, the system comprising:
   a first queuing stage configured to shape traffic from the data streams and having a plurality of shaping queues;
   a second queuing stage coupled to the first queuing stage and configured to manage congestion from the first queuing stage that occurs when multiple of the shaping queues become eligible to send traffic at substantially the same time, the second queuing stage having a plurality of queues different from the shaping queues in the first queuing stage; and
   wherein each of the shaping queues from the first queuing stage can have only one entry in a queue in the second queuing stage at a time.

2. A system for shaping traffic in accordance with claim 1 wherein the first queuing stage and second queuing stage are both defined, in part, by linked lists.

3. A system for shaping traffic in accordance with claim 2 wherein the first queuing stage includes a traffic shaping engine.

4. A system for shaping traffic in accordance with claim 3 wherein the second queuing stage includes a burst management engine different than the traffic shaping engine.

5. A system for shaping traffic in accordance with claim 3 wherein the first queuing stage includes a bandwidth allocation table coupled to the traffic shaping engine.

6. A system for shaping traffic in accordance with claim 3 wherein the first queuing stage includes a plurality of linked lists coupled to the traffic shaping engine, head/tail pointers coupled to the linked lists and to the shaping engine.

7. A system for shaping traffic in accordance with claim 3 wherein the first queuing stage is configured to assign a priority from a superset of predetermined priorities to a specific queue within the plurality of queues within the first queuing stage.

8. A system for shaping traffic in accordance with claim 6 wherein the traffic shaping engine directs an item of traffic coming in to the first stage to a selected one of the shaping queues depending on a characteristic of the item.

9. A system for shaping traffic in accordance with claim 3 wherein the traffic shaping engine manages when entries are eligible to be sent to the second stage.

10. A system for shaping traffic in accordance with claim 9 wherein the first queuing stage includes a bandwidth allocation table coupled to the traffic shaping engine, which is used to manage when entries are eligible to be sent to the second stage.

11. A system for shaping traffic in accordance with claim 3 wherein the second queuing stage includes a burst management engine different than the traffic shaping engine.

12. A system for shaping traffic in accordance with claim 11 wherein the second stage queues are defined by linked lists.

13. A system for shaping traffic in accordance with claim 12 wherein the second stage queues are further defined to be priority based.

14. A system for shaping traffic in accordance with claim 13 wherein the second stage queues are serviced in a starve-mode.

15. A method for shaping traffic from a plurality of data streams, the method comprising:
   shaping traffic from the data streams using a plurality of shaping queues in a first queuing stage, each of the shaping queues being assigned a predetermined profile of traffic;
   using a second queuing stage, managing congestion from the first queuing stage that occurs when multiple of the shaping queues become eligible to send traffic at substantially the same time by providing a plurality of queues in the second queuing stage different from the shaping queues in the first queuing stage; and
   wherein each of the shaping queues from the first queuing stage can have only one entry in a queue in the second queuing stage at a time.

16. The method of claim 15 further comprising servicing the second stage queues in a starve-mode.

17. The method of claim 15 further comprising assigning a priority from a superset of predetermined priorities to a specific queue with the plurality of queues within the first queuing stage.

18. The method of claim 15, wherein: the first queuing stage is defined by linked lists and the first queuing stage comprises a traffic shaping engine coupled to a bandwidth allocation table and head/tail pointers coupled to both the linked lists and the traffic shaping engine; and the managing congestion from the first queuing stage comprises utilizing the bandwidth allocation table to determine whether traffic is eligible to be sent to the second stage.

* * * * *